Nov. 17, 1931.  E. W. O'DOWD  1,832,728
FAUCET
Filed July 28, 1930
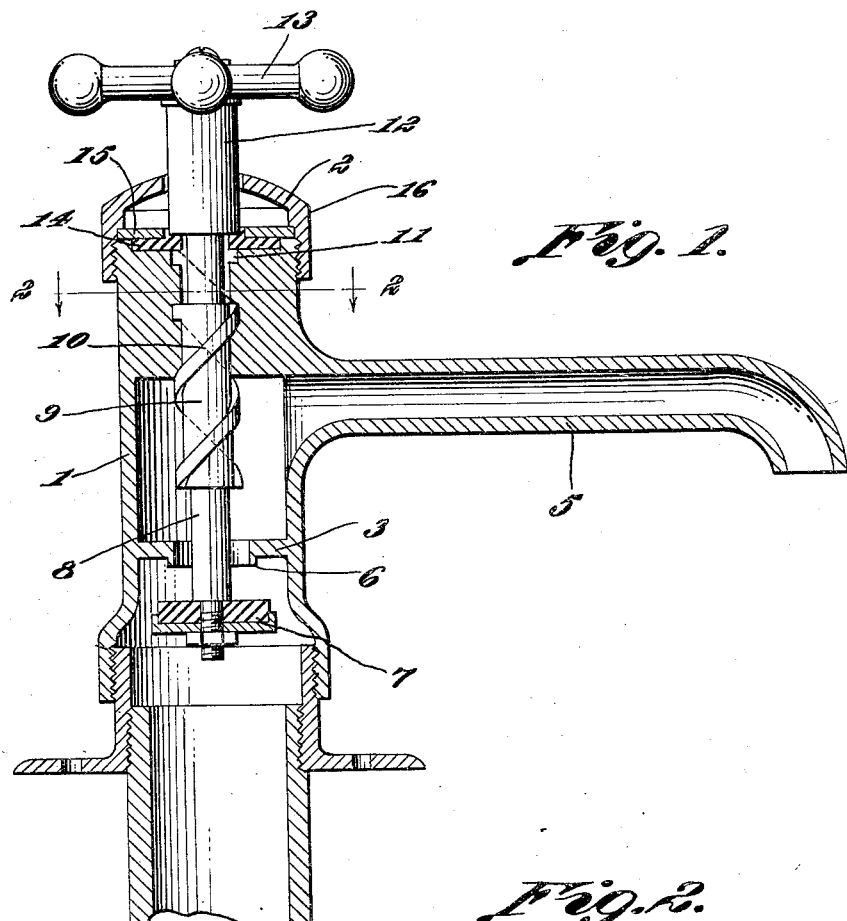
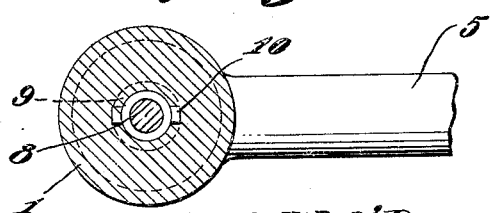
Earl W. O'Dowd,
INVENTOR
BY Victor J. Evans
ATTORNEY Patented Nov. 17, 1931

1,832,728

UNITED STATES PATENT OFFICE

EARL W. O'DOWD, NEW ORLEANS, LOUISIANA

FAUCET

Application filed July 28, 1930. Serial No. 471,292.

This invention relates to faucets, the general object of the invention being to provide means for automatically holding the faucet closed by the pressure of the water in the system.

Another object of the invention is to provide means for exerting pressure against a washer when the valve is open to prevent water leaking from the top of the faucet, said washer being so formed that it will not interfere with the closing of the valve by the water pressure.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a longitudinal sectional view through the improved faucet.

Figure 2 is a section on line 2—2 of Figure 1.

In these views, 1 indicates the body of the faucet and 2 indicates the cap thereof which is threaded to the top of the body. A partition 3 is arranged in the body and has an opening 4 therein through which the water passes on its way to the outlet spout 5. A depending flange 6 on the partition forms a valve seat for the valve 7 which is carried by the stem 8, said stem passing through the top part of the body and the cap. The stem is provided with an enlarged intermediate portion 9 provided with the spiral thread 10, the threads engaging spiral grooves 11 formed in the bore of the body. The upper end of the stem is also enlarged, as at 12, and a handle 13 is secured to this end of the stem. A gasket 14 is held on the top of the body by a washer 15 which is engaged by a shoulder 16 formed on the cap so that the washer and gasket are held in place by the cap. As will be seen, the washer has a central opening larger than that part of the stem located between the parts 9 and 12 so that it will not interfere with the movement of the stem through friction. When the valve is in open position, the shoulder formed by the lower end of the part 12 of the stem will engage the gasket and thus compress the same and thus prevent leakage of water at this point.

As will be seen, the water pressure in the system, acting upon the valve 7 will push the same onto its seat as the threads 10 and 11 are so formed that the friction between the parts is so slight that the water pressure can raise the valve and stem to close the valve. A pressure on the handle will open the valve.

Thus I have produced an automatically closing valve which is held closed by the water pressure and which can be easily opened by a pressure upon the handle or a turning movement of the same.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A faucet of the class described comprising a body having a bore in its upper part, the wall of which is provided with a spiral groove, a stem passing through the body and having a spiral thread thereon engaging the groove, a valve at the lower end of the stem, a valve seat in the body above the valve, a handle on the upper end of the stem, a cap threaded to the upper end of the body and through which the stem passes, a washer held in place by the cap, a gasket held between the washer and the top of the body, said washer having its central opening of greater diameter than that part of the stem which passes through it and said stem having a shoulder for engaging the gasket when the valve is in open position.

In testimony whereof I affix my signature.

EARL W. O'DOWD.